(12) United States Patent
Guilleminot et al.

(10) Patent No.: US 9,554,689 B2
(45) Date of Patent: Jan. 31, 2017

(54) USER INTERFACE—DEMO MODE

(71) Applicant: BSH Home Appliances Corporation, Irvine, CA (US)

(72) Inventors: Raphael Guilleminot, San Francisco, CA (US); Phillip Montanye, New Bern, NC (US); Graham Sadtler, Huntington Beach, CA (US); Elysa Soffer, San Francisco, CA (US); Robert Tannen, Philadelphia, PA (US)

(73) Assignee: BSH Home Appliances Corporation, Irvine, CA (US)

( * ) Notice: Subject to any disclaimer, the term of this patent is extended or adjusted under 35 U.S.C. 154(b) by 564 days.

(21) Appl. No.: 13/743,472

(22) Filed: Jan. 17, 2013

(65) Prior Publication Data

US 2014/0201628 A1 Jul. 17, 2014

(51) Int. Cl.
*G06F 3/048* (2013.01)
*A47L 15/42* (2006.01)
*G06F 3/01* (2006.01)
*G06F 3/0488* (2013.01)
*F24C 7/08* (2006.01)
*D06F 39/00* (2006.01)

(52) U.S. Cl.
CPC ......... *A47L 15/4293* (2013.01); *D06F 39/005* (2013.01); *F24C 7/082* (2013.01); *G06F 3/017* (2013.01); *G06F 3/0488* (2013.01)

(58) Field of Classification Search
CPC .... G06F 3/0488; G06F 3/017; A47L 15/4293; F24C 7/082; D06F 39/005
USPC ....................................... 715/705
See application file for complete search history.

(56) References Cited

U.S. PATENT DOCUMENTS 3,837,568 A   9/1974  Goodhouse et al.
3,872,463 A   3/1975  Lapeyre
4,109,245 A   8/1978  Hedin
              (Continued)

FOREIGN PATENT DOCUMENTS

EP        0651572 A2    5/1995

OTHER PUBLICATIONS

Jenn-Air, "Jenn-Air Built-In Electric Single and Double Oven—Use & Care Guide", 2011, Jenn-Air, pp. 1-35.
(Continued)

*Primary Examiner* — Patrick Riegler
*Assistant Examiner* — Nicholas Klicos
(74) *Attorney, Agent, or Firm* — Michael E. Tschupp; Andre Pallapies

(57) ABSTRACT

A method for demonstrating a domestic appliance, the domestic appliance having a controller, a display, and at least one user input component, the method comprising: displaying a plurality of images in accordance with a predetermined order on the display; while displaying a first image of the plurality of images in accordance with the predetermined order on the display, detecting at least one user input that is provided to the at least one user input component; responsive to the at least one user input, displaying a second image of the plurality of images that is associated with the at least one user input on the display for an amount of time; and subsequent to the amount of time, displaying the plurality of images on the display in accordance with the predetermined order resuming with a third image, said second image being different from said first image and said third image.

32 Claims, 6 Drawing Sheets

(56) References Cited

U.S. PATENT DOCUMENTS

| | | | |
|---|---|---|---|
| 5,111,028 A | 5/1992 | Lee | |
| 6,252,206 B1 | 6/2001 | Leukhardt, III et al. | |
| 6,750,433 B2 | 6/2004 | Guenther et al. | |
| 6,934,592 B2 | 8/2005 | Hood | |
| 6,936,801 B1 | 8/2005 | Head | |
| 6,976,004 B2 | 12/2005 | Wittrup | |
| 7,012,220 B2 | 3/2006 | Boyer et al. | |
| 7,057,142 B1 | 6/2006 | Lubrina | |
| 7,126,088 B2 | 10/2006 | Horton et al. | |
| 7,381,930 B2 | 6/2008 | Fisher | |
| 7,436,317 B2 | 10/2008 | Becke et al. | |
| 8,136,442 B2 | 3/2012 | Strutin-Belinoff et al. | |
| 8,843,825 B1* | 9/2014 | Whitman | G06F 17/30056 715/730 |
| 2001/0039460 A1 | 11/2001 | Aisa | |
| 2004/0200828 A1 | 10/2004 | Becker et al. | |
| 2006/0289465 A1 | 12/2006 | Balk et al. | |
| 2007/0057079 A1* | 3/2007 | Stark | H05K 5/0017 236/51 |
| 2007/0201373 A1* | 8/2007 | Williams | G06F 9/4446 370/241 |
| 2007/0203739 A1* | 8/2007 | Williams | G06Q 10/10 434/308 |
| 2007/0278320 A1* | 12/2007 | Lunacek | G05D 23/1902 236/94 |
| 2007/0298405 A1* | 12/2007 | Ebrom et al. | 434/365 |
| 2008/0005679 A1* | 1/2008 | Rimas-Ribikauskas | G01C 21/3688 715/745 |
| 2008/0109243 A1 | 5/2008 | Ebrom et al. | |
| 2008/0109311 A1* | 5/2008 | Ebrom et al. | 705/14 |
| 2009/0006970 A1* | 1/2009 | Jeffery | D06F 33/02 715/733 |
| 2009/0306827 A1* | 12/2009 | Kim et al. | 700/275 |
| 2010/0147823 A1* | 6/2010 | Anderson et al. | 219/391 |
| 2010/0182136 A1* | 7/2010 | Pryor | G01F 23/292 340/425.5 |
| 2010/0238183 A1 | 9/2010 | Sakanaka et al. | |
| 2011/0062143 A1 | 3/2011 | Satanek | |
| 2011/0087987 A1 | 4/2011 | Brown | |
| 2011/0090255 A1 | 4/2011 | Wilson et al. | |
| 2011/0151072 A1 | 6/2011 | Anderson et al. | |
| 2012/0032514 A1* | 2/2012 | Alberghetti et al. | 307/48 |
| 2012/0074123 A1* | 3/2012 | Hodapp et al. | 219/394 |
| 2012/0248879 A1* | 10/2012 | Arrigoni et al. | 307/80 |
| 2013/0067419 A1 | 3/2013 | Eltoft | |
| 2013/0092033 A1 | 4/2013 | Murphy | |
| 2013/0093685 A1 | 4/2013 | Kalu et al. | |
| 2013/0141371 A1* | 6/2013 | Hallford et al. | 345/173 |
| 2013/0145295 A1 | 6/2013 | Bocking | |
| 2013/0154959 A1 | 6/2013 | Lindsay et al. | |
| 2013/0191754 A1* | 7/2013 | Rose | 715/732 |
| 2013/0214935 A1 | 8/2013 | Kim et al. | |
| 2013/0269539 A1 | 10/2013 | Polt | |
| 2013/0277353 A1 | 10/2013 | Joseph et al. | |
| 2013/0321444 A1 | 12/2013 | Efrati et al. | |
| 2014/0123183 A1* | 5/2014 | Fujimoto et al. | 725/37 |
| 2014/0317501 A1* | 10/2014 | Brasseur et al. | 715/702 |

OTHER PUBLICATIONS

Apple, Inc., "iPad User Guide for iOS 5.1 Software", 2012, pp. 1-144.

Gorenje iChef—Global revolution through touch control, Online: Gorenje.com, 2011.

Sarah Branny, Awesome Samsung Fridge With Built-in Tablet, Online: Techmento.com, Jul. 2011.

Angela Wardriver, Electrolux Design Concept "Heart of the Home" animation, Online: Dailyfork.com, Mar. 9, 2010.

The CDA Group, Ltd., SV310SS Oven—Manual for Installation, Use and Maintenance, Jun. 8, 2012.

Mark Hamblin, Taking touch to New Frontiers: Why it Makes Sense and How to Make it Happen, Information Display, vol. 26, Issue 3, p. 36-39, Jan. 1, 2010.

SieMatic, sieMatic S1-Grid, Online: Houseautomator.com, Nov. 13, 2009.

Elliot Thomas Chapple, Integrating Interactive Systems Within the Home Environment, Online: bath.ac.uk, 2008.

Manufacturer: Gaggenau, Gaggenau 200 Series BO251, Online: AJMadison.com, Accessed Jun. 11, 2012.

Sarah Mennicken, Personalchef—Cooking Guidance Through an Interactive Multi-Display Kitchen Counter, Online: RWTH Aachen University, Publication: Jun. 24, 2009.

Manufacturer: Electrolux, Electrolux—Introducing the New Collection, Online: AJMadison.com, Publication: Jan. 2008.

\* cited by examiner

USER INTERFACE—DEMO MODE

FIELD OF THE TECHNOLOGY

The present technology relates to a demonstration mode for a domestic appliance, e.g., ovens.

BACKGROUND OF THE TECHNOLOGY

Domestic appliances are commonly displayed for sale on a showroom floor of the seller. This allows potential purchasers/users to browse the various appliances and see them first-hand. As appliances have become modernized they have come to incorporate more modern features like interactive user interfaces. These user interfaces incorporate, for example, LCD screens to display complex information or images and controllers with CPUs to drive the more complex content to the display.

In the retail showroom environment it is desirable for the appliance to be able to showcase the features that make the appliance attractive to the potential purchaser/user. Several demonstration modes are known and include active and passive features. Ebrom et al., U.S. Patent Application Publication No. 2008/0109243, teaches a demonstration mode that includes a slideshow, which is a passive feature, and an active feature that can recognize the customer and tailor the demonstration to the customer.

Another important factor to be considered in the retail showroom environment is the limited amount of time a salesperson has with a customer. Therefore, the salesperson must be able to tailor the sales pitch to the customer and highlight certain features. An appliance having a screen capable of displaying information about the features of the appliance can be helpful to the salesperson. However, the appliance must be capable of interaction to showcase specific features as desired by the salesperson, while at the same time the appliance must able to passively showcase its features to generate interest in the customer without the salesperson present.

A need has developed to address one or more shortcomings of the prior art.

SUMMARY OF THE TECHNOLOGY

One aspect of the present technology is to provide a demonstration mode for a domestic appliance that overcomes one or more shortcomings of the prior art.

Another aspect of the present technology is directed to a method for demonstrating a domestic appliance and having a controller, a display, and at least one user input component. The method includes displaying a plurality of images in accordance with a predetermined order on the display; while displaying a first image of the plurality of images in accordance with the predetermined order on the display, detecting at least one user input that is provided to the at least one user input component; responsive to the at least one user input, displaying a second image of the plurality of images that is associated with the at least one user input on the display for an amount of time; and subsequent to the amount of time, displaying the plurality of images on the display in accordance with the predetermined order resuming with a third image, said second image being different from said first image and said third image.

In examples, (a) the at least one user input component may comprise a plurality of buttons and the at least one user input may comprise a button press to one of the plurality of buttons, (b) the plurality of buttons may comprise a plurality of capacitive touch buttons, (c) the method may include correlating the at least one user input to a gesture type in the controller, said gesture type comprising one of a leftward swipe and a rightward swipe and determining the gesture type from among a plurality of gesture types, (d) the method may include correlating the at least one user input to a gesture type in the controller, said gesture type comprising a touch input and determining the gesture type from among a plurality of gesture types with the controller, and/or (e) the at least one user input may comprise the touch input, the at least one user input component may comprise a touch input element coextensive with the display, and the second image may comprise a simulation image to simulate operation of the appliance.

Another aspect of the present technology is directed to a domestic appliance having a user interface for demonstrating said domestic appliance. The domestic appliance includes at least one user input component programmed to detect at least one user input and a display configured to display a plurality of images in an order, said plurality of images comprising a first image, a second image, and a third image, said second image being different from said first image and said third image; responsive to the at least one user input, display the second image of the plurality of images that is associated with the at least one user input for an amount of time; and subsequent to the amount of time, display the plurality of images in accordance with the order by resuming with display of the third image.

In examples, (a) the at least one user input component may comprise a plurality of buttons and the at least one user input may comprise a button press to one of the plurality of buttons, (b) the plurality of buttons may comprise a plurality of capacitive touch buttons, (c) the controller may be further configured to correlate the at least one user input to a gesture type, said gesture type comprising one of a leftward swipe and a rightward swipe, and determine the gesture type from among a plurality of gesture types, (d) the controller may be further configured to correlate the at least one user input to a gesture type, said gesture type comprising a touch input, and determine the gesture type from among a plurality of gesture types, and/or (e) the at least one user input may comprise the touch input, the at least one user input component may comprise a touch input element coextensive with the display, and the second image may comprise a simulation image to simulate operation of the appliance.

Another aspect of the present technology is directed to a non-transitory computer readable medium storing instructions for execution by at least one processor included in a domestic appliance that includes a display and at least one user input device. The stored instructions comprise instructions configured to output a plurality of images to the display in accordance with an order, the plurality of images including a first image, a second image, and a third image; while the first image is being displayed on the display, determine at least one user input that is input via the at least one user input device; responsive to the at least one user input, output the second image, which is associated with the at least one user input, to the display for an amount of time; and subsequent to the amount of time, output the plurality of images to the display in accordance with the predetermined order resuming with a third image, said second image being different from said first image and said third image.

Other aspects, features, and advantages of this technology will become apparent from the following detailed description when taken in conjunction with the accompanying drawings, which are a part of this disclosure and which illustrate, by way of example, principles of this technology.

BRIEF DESCRIPTION OF THE DRAWINGS

The accompanying drawings facilitate an understanding of the various examples of the present technology. In such drawings.

DETAILED DESCRIPTION OF ILLUSTRATED EXAMPLES

The following description is provided in relation to several examples which may share common characteristics and features. It is to be understood that one or more features of any one example may be combinable with one or more features of the other examples. In addition, any single feature or combination of features in any of the examples may constitute additional examples.

Figure 1:
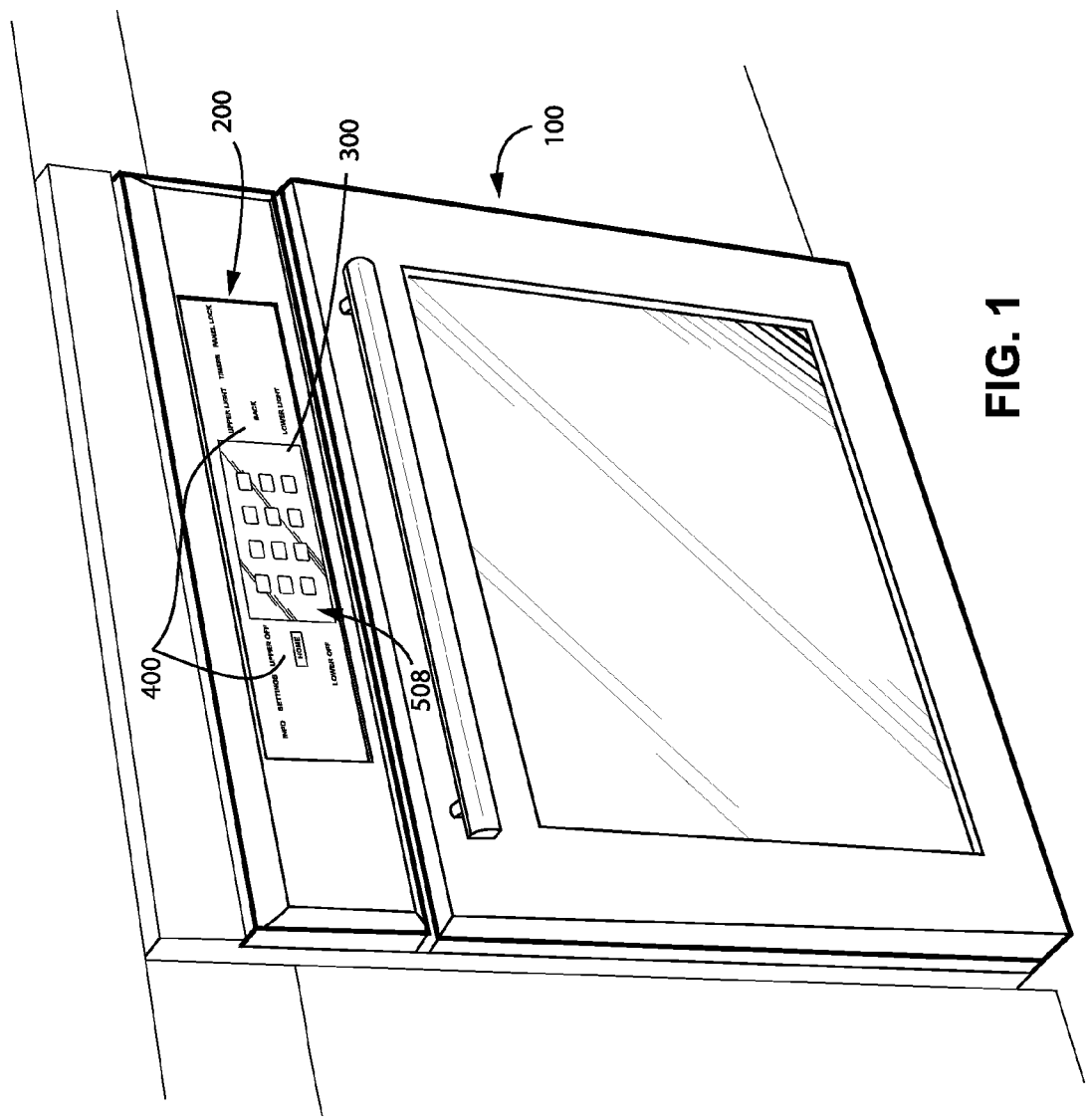
FIG. 1 is a perspective view of a domestic appliance having a user interface, according to an example of the present technology.

FIG. 1 shows a perspective view of a domestic appliance 100 installed as it commonly would be in a home. The particular domestic appliance 100 shown is an oven installed in a wall of a kitchen. The domestic appliance 100 of FIG. 1 shows a user interface 200 having a display 300. In this example, the display 300 may be a thin film transistor display and may include at least one user input component 508 that may be a capacitive touch input element. The at least one user input component 508 may also be coextensive with the display 300. Also in this example, the user interface 200 may include a plurality of buttons 400 that also include capacitive touch elements.

Figure 2:
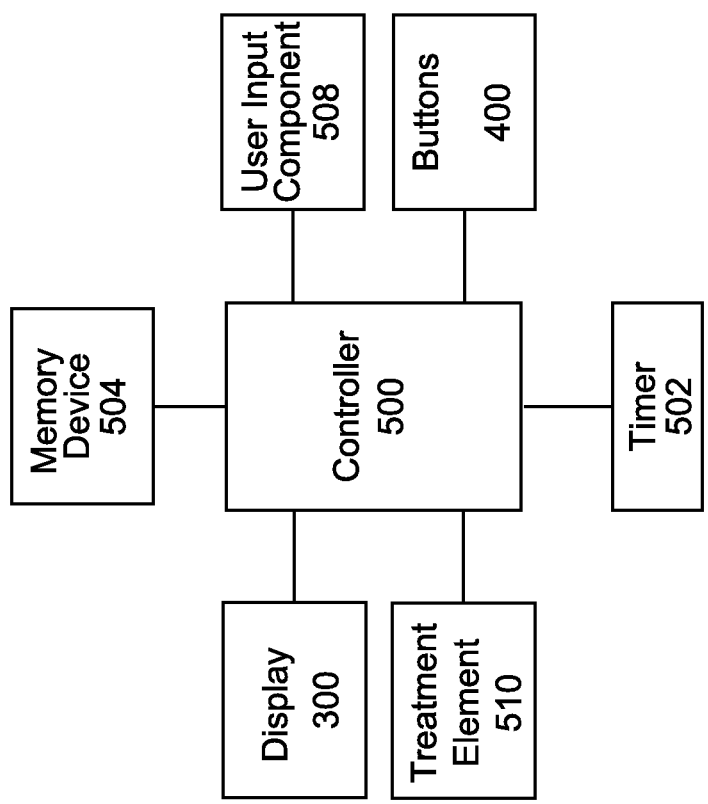
FIG. 2 is a schematic of the user interface, according to an example of the present technology.

FIG. 2 shows a schematic of the components of the user interface of a domestic appliance in accordance with the present technology. The components may include a controller 500 for coordinating the operation of the user interface. A display 300 may be operationally controlled by the controller 500. A timer 502 may be included to time how long a particular screen is displayed on the display 300 or to time a period of inactivity. The period of inactivity being a time during which no user input is detected by the system. The user input component 508 may be any type of component that receives an input from a user and communicates or programs the same to the controller 500. Specifically, it is envisioned that commonly known touchscreen input devices, such as a capacitive touch input element, will comprise the user input component. The buttons 400 may also communicate or program various user inputs to the controller 500. The buttons 400 may be capacitive touch buttons or may comprise a capacitive touch input element. The user would then manually input the parameters by touching the user interface. A memory device 504 may also be included to store the functional parameters (e.g., treatment time, treatment mode, treatment temperature, etc.) input to the controller 500 through the user input component 508. At least one treatment element 510 may also be included for the treatment of the contents of the appliance.

Figure 3:
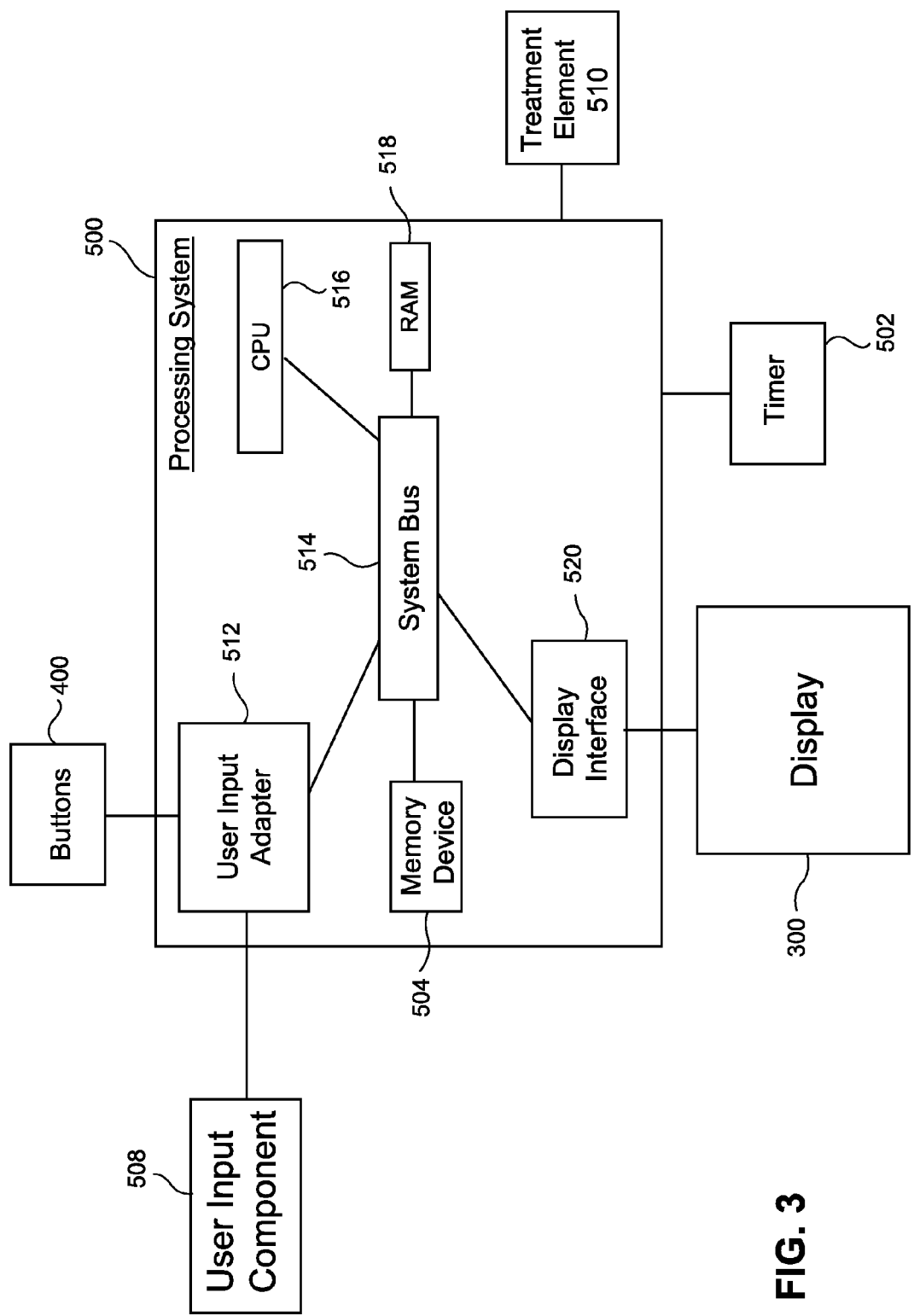
FIG. 3 is a block diagram of a processing system of the user interface, according to an example of the present technology.

FIG. 3 is a block diagram of an exemplary computing system according to certain examples. A processing system or controller 500 may include a central processing unit or CPU 516, a system bus 514 that communicates with RAM 518 and storage or a memory device 504. The storage 504 can be magnetic, flash based, solid state, or other storage technology. The system bus 514 may also communicate with a user input adapter 512 that allows users to input commands to the processing system via a user input component 508 (e.g., a touch input element or the like) and/or buttons 400. The results of the processing may be displayed to a user on a display 300 via a display interface 520 (e.g., a video card or the like). The memory device 504 may also be included to store the functional parameters (e.g., treatment time, treatment mode, treatment temperature, etc.) input to the controller 500 through the user input component 508. The controller 500 may also operate the treatment element 510.

The treatment element(s) 510 may be included to facilitate the treatment of contents by the domestic appliance 100. For example, the domestic appliance 100 may also include a chamber that holds the contents and a door to enclose the contents in the domestic appliance 100 and such domestic appliance may be an oven, a dishwasher, a washing machine, a drier, a microwave oven, a coffee maker, a refrigerator, and/or a freezer, etc. Thus, the contents may be food, consumable liquids, crockery, dishes, stoneware, flatware, bakeware, and/or clothing, etc. It is also contemplated that the domestic appliance may not necessarily include a chamber and door for enclosing the contents or items and in such a case the domestic appliance may be a vacuum cleaner, a blender, and an iron, etc. Treatment by the domestic appliance is contemplated to comprise cooking, baking, heating, steaming, sanitizing, dis-infecting, cooling, freezing, cleaning, washing, vacuuming, and/or blending, etc. The treatment element 510, in the example where the appliance 100 is an oven and the contents are food, is at least one heating element that may include an electric resistance heating element or a gas burner. A fan may also comprise the treatment element 510 in the case of a convection oven that performs convection heating of the food. Other treatment elements, as commonly known in the art, may also comprise the treatment element.

The processing system 500 may also communicate with the additional components of the domestic appliance, e.g., timer 502 and treatment element 510. It should also be noted that the timer 502 may be comprised within the processing system 500, rather than as a separate component.

Certain examples herein are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both.

Figure 4:
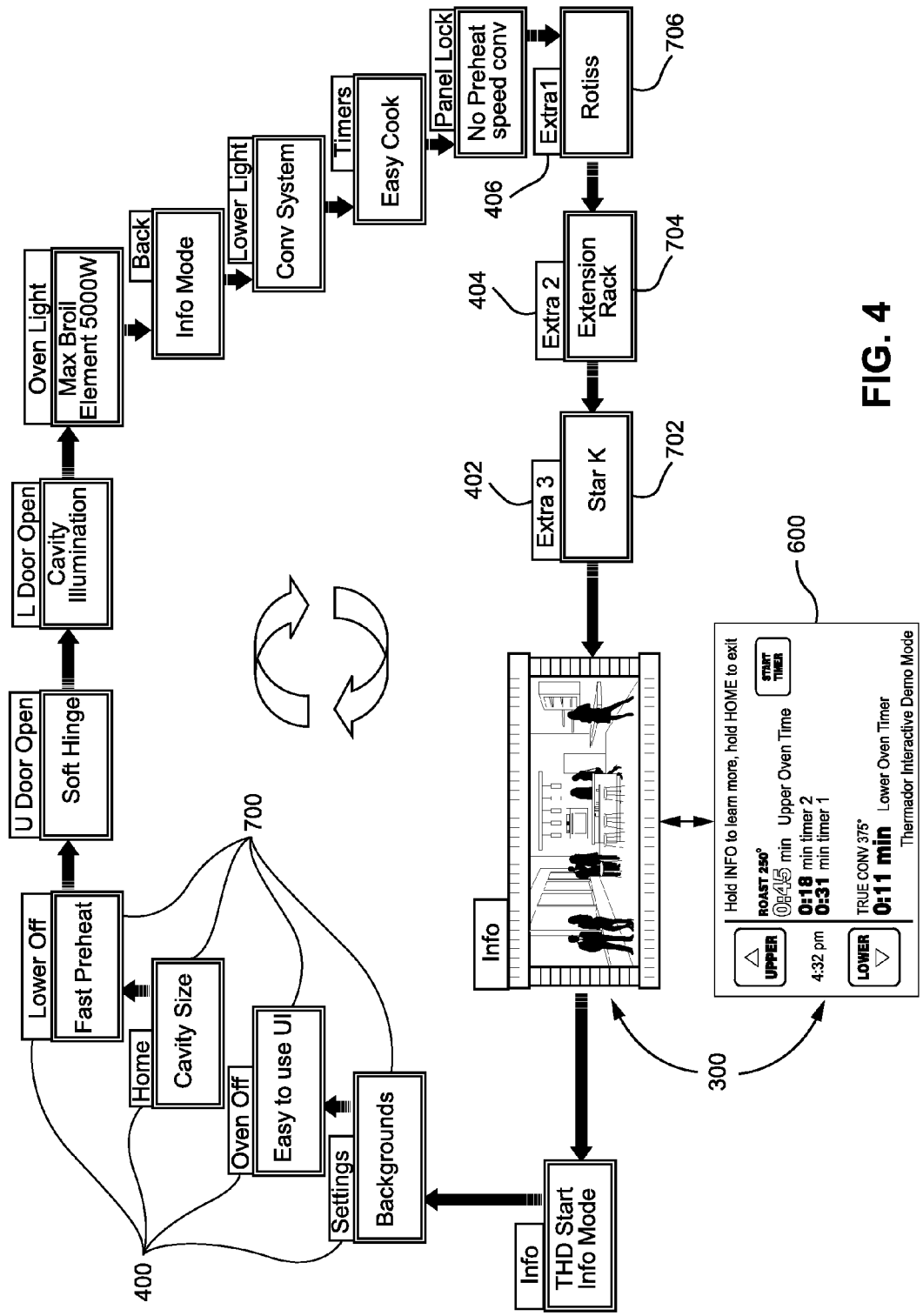
FIG. 4 is a flowchart of a demonstration mode for a domestic appliance, according to an example of the present technology.
Figure 5:
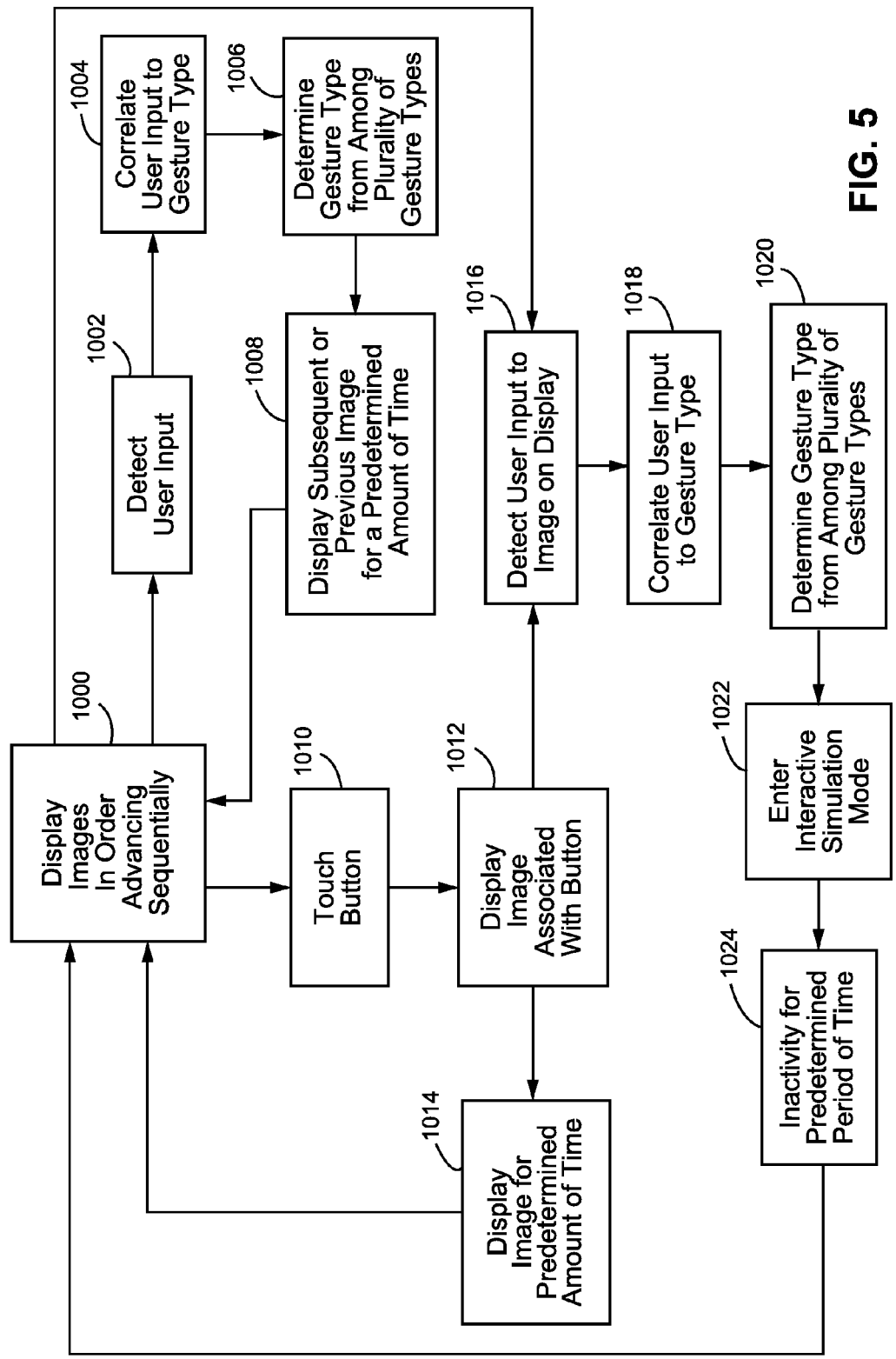
FIG. 5 is a flowchart of a demonstration mode for a domestic appliance, according to an example of the present technology.

FIGS. 4 and 5 are flowcharts of a demonstration mode for a domestic appliance in accordance with an example of the present technology. These flowcharts will be explained together and their relationship will become clear by way of the subsequent discussion. The demonstration mode includes a plurality of images 700 displayed in an order on the display 300 that are advanced sequentially. Each of the plurality of images 700 may be associated with a feature of the domestic appliance to describe that feature to a user. The sequential advancement of the plurality of images 700 may comprise displaying a first image for a period of time and then advancing to a subsequent or second image. This advancement of images through the order may be automatic, as controlled by the controller 500. This function is exemplified by step 1000 in FIG. 5. The plurality of images 700 may describe, illustrate, and/or depict a variety of features such as: (1) a THD Start Info Mode, (2), Backgrounds, (3) an Easy to Use User Interface, (4) Cavity Size, (5) Fast Preheat, (6) a Soft Hinge, (7) Cavity Illumination, (8) a Max Broil Element with 5000 W of power, (9) an Info Mode, (10) the Convection System, (11) an Easy Cook feature, (12), a No Preheat Speed Convection mode, (13) a Rotisserie feature, (14) the Extension Rack, and/or (15) the Star K kosher feature.

The user may also interact with the user interface 200 and provide inputs thereto. For example, the user may swipe on the display 300 in a leftward or rightward direction. A user input component 508 included optionally coextensive with the display 300, as shown in FIG. 1, may detect this user input and communicate the same to the controller 500. This function is exemplified by step 1002 in FIG. 5. The controller 500 then correlates the user input to a gesture type and then determines which gesture type has been inputted from among a plurality of gesture types. This functionality may be accomplished by comparing the user input detected by the user input component to a plurality of gesture types stored in at least one lookup table. These functions are exemplified by steps 1004 and 1006, respectively, in FIG. 5. Then, according to the gesture type detected, the first image displayed of the plurality of images may be advanced to a second image in the order. This function is exemplified by step 1008 in FIG. 5. A leftward or rightward swipe may cause the display to display either a subsequent or preceding image of the plurality of images 700, as the second image.

For example, in the order shown in FIG. 4 a rightward swipe may advance the display 300 to display the subsequent image in the order of the plurality of images 700. Thus, if the image associated with Extension Rack 704 is displayed as the first image and a rightward swipe is detected, then the image associated with Star K 702 is displayed as the second image. Also, in the order shown in FIG. 4 a leftward swipe may cause the display 300 to display the preceding image in the order of the plurality of images 700. Thus, if the image associated with Extension Rack 704 is displayed as the first image and a leftward swipe is detected, then the image associated with Rotiss 706 is displayed as the second image. This is but one example of how the user may navigate forward or backward through the order of the plurality of images 700. It is also envisioned the swipe directions could cause the images to advance in the opposite directions.

Also, as above, automatic advancement of the plurality of images through the order may take place such that when the second image is displayed for a period of time, an image subsequent to the second image may then be displayed, similar to a slideshow. Thus, further to the above example, if the first image is the image associated with Extension Rack 704 is displayed and user input causes the display 300 to display the image associated with Rotiss 706, then after a period of time displaying image 706 the display will display the image associated with Extension Rack 704 again because it is the subsequent image in the order. At this point automatic advancement through the plurality of images 700 has returned and will continue sequential display of the images on the display 300 unless a further user input is detected. Also in accordance with this example, if the image associated with Rotiss 706 is displayed and user input causes the subsequent image in the order to be displayed, which in FIG. 4 would be the image associated with Extension Rack 704, then upon return to the automatic and sequential advancement the image associated with Star K 702 would be displayed.

Another exemplary function of the demonstration mode may include touching one of the plurality of buttons 400, which causes a specific image of the plurality of images 700 to be displayed where that specific image is associated with a specific one of the plurality of buttons. For example, in FIG. 4, if the image associated with Star K 702 is displayed on the display 300 while the controller 500 is directing automatic and sequential advancement through the plurality of images in the order and the Extra 1 button 406 receives user input, then the image associated with Rotiss 706 is displayed on the display 300. These functions are exemplified by steps 1010 and 1012, respectively, in FIG. 5. As above, once the image associated with Rotiss 706 is displayed on the display 300 for a period of time the automatic and sequential advancement through the order of the plurality of images 700 continues and the image associated with Extension Rack 704 will then be displayed and so on through the order as shown in FIG. 4. This function is exemplified by step 1014 in FIG. 5.

Another exemplary function of the demonstration mode may include navigation to a simulation mode. When any one of the plurality of images 700 is displayed on the display 300, the user input component 508 that is coextensive with the display may detect a touch input. This function is exemplified by step 1016 in FIG. 5. This touch input may comprise a tap or any other like input detectable by the user input component. This touch input, once detected, will be communicated to the controller 500, which will correlate the user input to a gesture type and then determine the gesture type from among a plurality of gesture types. This functionality may be accomplished by comparing the user input detected by the user input component to a plurality of gesture types stored in at least one lookup table. These functions are exemplified by steps 1018 and 1020, respectively, in FIG. 5.

If the gesture is a touch input to the user input component 508, the controller 500 will cause the display to enter an interactive simulation mode and display an image or screen 600 associated therewith. This function is exemplified by step 1022 in FIG. 5. The interactive simulation mode will in fact comprise a plurality of simulation images such that the user may interact with the appliance as if her or she were actually using it without any associated treatment by the appliance occurring. This allows the user to learn and explore the various function of the appliance while the appliance does not use additional energy associated with actual operation. Again, as above, after a period of time has passed without further user inputs to the user interface 200 while images 600 of the interactive simulation mode are displayed the controller 500 will cause the display 300 to return to advancing sequentially through the plurality of images 700 in order. This function is exemplified by step 1024 in FIG. 5.

Figure 6:
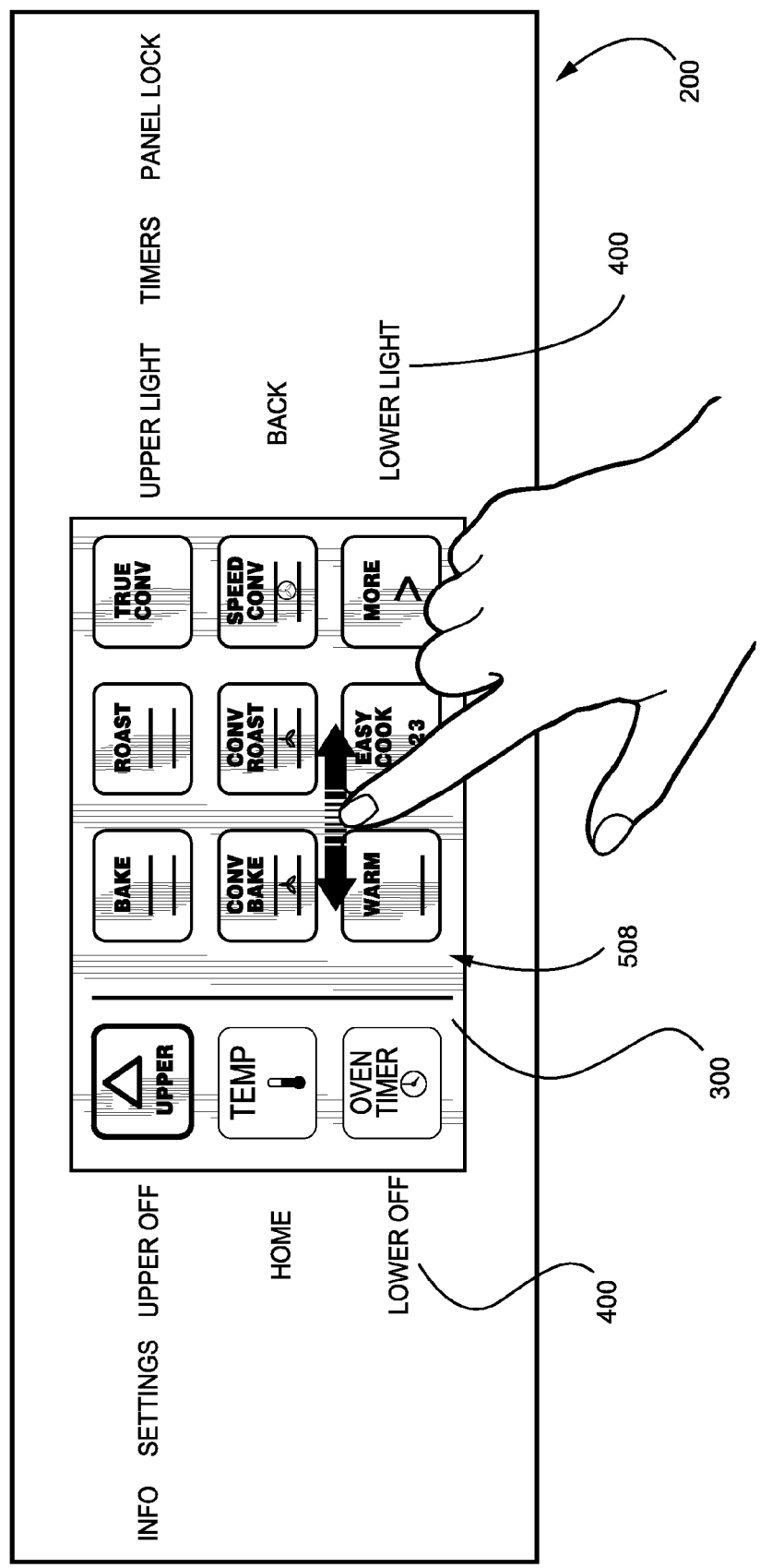
FIG. 6 is a view of user input to a user input component of the domestic appliance, according to an example of the present technology.

FIG. 6 is a view of a user input to the user input component 508. The user input component 508 may be coextensive with the display 300 such that the user may interact with portions of the image displayed on the screen. In this view, exemplary user inputs are shown where the hand of a user is shown providing an input to the user input component 508. Specifically, the leftward and rightward swipes of the plurality of gesture types are indicated by the arrows.

While the present technology has been described in connection with what are presently considered to be the most practical and preferred examples, it is to be understood that the technology is not to be limited to the disclosed examples, but on the contrary, is intended to cover various modifications and equivalent arrangements included within the spirit and scope of the technology.

What is claimed is:

1. A method for demonstrating functionality of a domestic appliance, the domestic appliance having a controller, a display, and at least one user input component, the method comprising:
    displaying a series of images including a first image, a second image, and a third image in accordance with a predetermined order on the display, each image in the series of images being displayed automatically for a predetermined period of time in the predetermined order, and each image being associated with a different feature of the domestic appliance to describe that feature to a user;
    detecting at least one user input provided to the at least one user input component with the controller while the display is automatically displaying an image of the series of images in the predetermined order;
    correlating the at least one user input to one of a plurality of gesture types;
    determining a first gesture type from among the plurality of gesture types by the controller;
    responsive to the first gesture type determined, displaying an interactive simulation on the display, the interactive simulation being associated with the image displayed when the at least one user input is detected, the interactive simulation being responsive to additional user input, and the interactive simulation comprising a plurality of simulation images that allow the user to interact with the domestic appliance without performing a treatment functionality associated with the interactive simulation; and
    receiving additional user input detected by the at least one user input component with the controller while the display is displaying the interactive simulation subsequent to an amount of time, and in response to said additional user input, resuming displaying the series of images on the display in accordance with the predetermined order with another image of the series of images.

2. The method of claim 1, wherein the at least one user input component comprises a plurality of buttons and the at least one user input comprises a button press to one of the plurality of buttons.

3. The method of claim 2, wherein the plurality of buttons comprises a plurality of capacitive touch buttons.

4. The method of claim 1, wherein the third image is subsequent to the second image in the predetermined order of the series of images.

5. The method of claim 1, determining a second gesture type from among the plurality of gesture types, wherein the second gesture type is one of a leftward swipe and a rightward swipe.

6. The method of claim 5, wherein the third image is subsequent to the second image in the predetermined order of the series of images.

7. The method of claim 6, wherein the second image is subsequent to the first image in the predetermined order of the series of images and the second gesture is the leftward swipe.

8. The method of claim 6, wherein the second image precedes the first image in the predetermined order of the series of images and the second gesture type is the rightward swipe and the first image and the third image are the same.

9. The method of claim 6, wherein the second image is subsequent to the first image in the predetermined order of the series of images and the second gesture type is the rightward swipe.

10. The method of claim 6, wherein the second image precedes the first image in the predetermined order of the series of images and the second gesture type is the leftward swipe and the first image and the third image are the same.

11. The method of claim 1, further comprising:
    storing the series of images in the predetermined order on a memory device of the domestic appliance.

12. The method of claim 1, wherein the at least one user input component comprises at least one touch input element.

13. The method of claim 1, wherein the series of images further comprises a last image, and
    wherein displaying the series of images in accordance with the predetermined order on the display further comprises automatically displaying the first image after the last image of the series of images.

14. A domestic appliance having a user interface for demonstrating functionality of said domestic appliance, the domestic appliance comprising:
    at least one user input component programmed to detect at least one user input;
    a display; and
    a controller configured to:
        instruct the display to automatically display a series of images in a predetermined order for a predetermined period of time, the series of images comprising a first image, a second image, and a third image, and each image in the series of images being associated with a different feature of the domestic appliance to describe that feature to a user;
        receive user input detected by the at least one user input component while instructing the display to automatically display an image of the series of images in the predetermined order;
        correlate the at least one user input to one of a plurality of gesture types;
        determine a first gesture type from among the plurality of gesture types by the controller;
        responsive to the gesture type determined, instruct the display to display an interactive simulation, the interactive simulation being associated with the image displayed when the at least one user input is detected, the interactive simulation being responsive to additional user input, and the interactive simulation comprising a plurality of simulation images that allow the user to interact with the domestic appliance without performing a treatment functionality associated with the interactive simulation; and
        subsequent to an amount of time, receive additional user input detected by the at least one user input component while the display is displaying the interactive simulation and, in response to receiving said additional user input, instruct the display to resume displaying the series of images in accordance with the predetermined order by resuming with display of another image of the series of images.

15. The domestic appliance of claim 14, wherein the at least one user input component comprises a plurality of buttons and the at least one user input comprises a button press to one of the plurality of buttons.

16. The domestic appliance of claim 15, wherein the third image is subsequent to the second image in the predetermined order of the series of images.

17. The domestic appliance of claim 15, wherein the plurality of buttons comprises a plurality of capacitive touch buttons.

18. The domestic appliance of claim 14, wherein the controller is configured to determine a second gesture type from among the plurality of gesture types, wherein the second gesture type is one of a leftward swipe and a rightward swipe.

19. The domestic appliance of claim 18, wherein the second image is adjacent to the first image in the predetermined order of the series of images and the third image is subsequent to the second image in the predetermined order of the series of images.

20. The domestic appliance of claim 19, wherein the second image is subsequent to the first image in the predetermined order of the series of images and the second gesture is the leftward swipe.

21. The domestic appliance of claim 19, wherein the second image precedes the first image in the predetermined order of the series of images and the second gesture type is the rightward swipe and the first image and the third image are the same.

22. The domestic appliance of claim 19, wherein the second image is subsequent to the first image in the predetermined order of the series of images and the second gesture type is the rightward swipe.

23. The domestic appliance of claim 19, wherein the second image precedes the first image in the predetermined order of the series of images and the second gesture type is the leftward swipe and the first image and the third image are the same.

24. The domestic appliance of claim 14, wherein the gesture type is a touch input.

25. The domestic appliance of claim 24, wherein the at least one user input is the touch input, the at least one user input component is a touch input element coextensive with the display, and the second image comprises a simulation image to simulate operation of the domestic appliance.

26. The domestic appliance of claim 14, further comprising:
a memory device programmed to store the series of images in the predetermined order.

27. The domestic appliance of claim 14, wherein the display comprises a thin film transistor display.

28. The domestic appliance of claim 14, wherein the at least one user input component comprises at least one touch input element.

29. The domestic appliance of claim 28, wherein the at least one touch input element comprises at least one capacitive touch input element.

30. The domestic appliance of claim 28, further comprising:
an oven;
a treatment chamber;
at least one treatment element; and
a door to enclose contents in the treatment chamber.

31. The domestic appliance of claim 14, wherein the series of images further comprises a last image, and
wherein the controller is further configured to instruct the display to automatically display the first image after the last image of the series of images.

32. A non-transitory computer readable medium storing instructions for execution by at least one processor included in a domestic appliance that includes a display and at least one user input device, the stored instructions comprising instructions configured to:
automatically output a series of images to the display in accordance with a predetermined order after a predetermined period of time, the series of images including a first image, a second image, and a third image, and each image being associated with a different feature of the domestic appliance to describe the feature to a user;
while an image of the series of images is automatically displayed on the display, determine at least one user input that is detected by the at least one user input device;
correlate the at least one user input to one of a plurality of gesture types;
determine a first gesture type from among the plurality of gesture types;
responsive to the first gesture type determined, display an interactive simulation on the display, the interactive simulation being associated with the image displayed when the at least one user input is detected, the interactive simulation being responsive to additional user input, and the interactive simulation comprising a plurality of simulation images that allow the user to interact with the domestic appliance without performing a treatment functionality associated with the interactive simulation; and
subsequent to an amount of time, receive additional user input detected by the at least one user input device while the display is displaying the interactive simulation and, in response to said additional user input detected, resume outputting of the series of images to the display in accordance with the predetermined order by resuming with another image in the series of images.

* * * * *